United States Patent [19]

Gore

[11] Patent Number: 5,064,676
[45] Date of Patent: Nov. 12, 1991

[54] FLAKED COFFEE WITH IMPROVED BREWING PROPERTIES

[75] Inventor: William J. Gore, Cincinnati, Ohio

[73] Assignee: The Procter & Gamble Company, Cincinnati, Ohio

[21] Appl. No.: 557,428

[22] Filed: Jul. 23, 1990

[51] Int. Cl.$^5$ .............................................. A23F 5/00
[52] U.S. Cl. ........................................................ 426/595
[58] Field of Search ........................................ 426/595

[56] References Cited

U.S. PATENT DOCUMENTS

| | | |
|---|---|---|
| 2,281,320 | 4/1942 | Odell . |
| 3,615,667 | 10/1971 | Joffe .................................. 426/594 X |
| 3,625,704 | 12/1971 | Andre et al. . |
| 3,640,727 | 2/1972 | Heusinkveld . |
| 3,660,106 | 5/1972 | McSwiggin et al. . |
| 3,769,031 | 10/1973 | McSwiggin ........................ 426/148 |
| 4,110,485 | 8/1978 | Grubbs et al. ...................... 426/595 |
| 4,267,200 | 5/1981 | Klien et al. ........................ 426/595 |
| 4,331,696 | 5/1982 | Bruce ................................ 426/595 |

OTHER PUBLICATIONS

Sivetz & Desrosier, Coffee Technology, Avi Publishing Co., Westport, CT, pp. 537 and 701 (1979).

*Primary Examiner*—Joseph Golian
*Attorney, Agent, or Firm*—Gary M. Sutter; Ronald L. Hemingway; Richard C. Witte

[57] ABSTRACT

The invention is a roast and ground flaked coffee that provides the benefits of increased extractability and decreased brewing time. The coffee is produced specifically for use with foodservice industry ½-gallon brewers or urn brewers. The coffee flakes particularly suited for use in a ½-gallon brewer have a thickness of from about 0.004 inch to about 0.018 inch (about 0.10 mm to about 0.46 mm), a moisture level of from about 3% by weight to about 6% by weight, and a particle size fines level such that from about 30% to about 50% by weight of the particles pass through a No. 20 U.S. Standard Screen. The flake thickness, moisture level, and fines level are related by a brew solids equation.

16 Claims, No Drawings

FLAKED COFFEE WITH IMPROVED BREWING PROPERTIES

BACKGROUND OF THE INVENTION

1. Field of the Invention

This invention relates to the field of flaked roast and ground coffee. More particularly, the invention relates to flaked coffee with increased extractability and decreased brewing time.

2. Description of the Related Art

Numerous prior patents disclose various kinds of flaked roast and ground coffee. For example, U.S. Pat. No. 3,615,667 to Joffe, issued Oct. 26, 1971, discloses thick-flaked roast and ground coffee characterized by improved flavor and aroma. The flake thickness is 0.008-0.025 inch (0.20-0.63 mm), preferably 0.010-0.016 inch (0.25-0.41 mm), and the flake moisture level is 2.5-7.0% by weight, preferably 3.0-6.0%. The flakes have a particle size such that 3-10% pass through a No. 40 U.S. Standard Screen and not more than 35% remain on a No. 12 screen.

U.S. Pat. No. 4,331,696 to Bruce, issued May 25, 1982, discloses extra-thin flaked roast and ground coffee with structural integrity. The flake thickness ranges from 0.004 to 0.008 inch (0.10-0.20 mm). The flaked coffee has no more than 90% by weight particles passing through a No. 30 U.S. Standard Screen, and preferably 40-70% particles passing through a No. 30 screen. The moisture content of the flakes is between 2.5% and 9.0% by weight, preferably between 3.5% and 7.0%.

U.S. Pat. No. 4,267,200 to Klien et al., issued May 12, 1981, discloses coffee flake particles that are aggregates of low moisture flakes (1% to 3.5% moisture by weight) and high moisture flakes (4.5% to 7% moisture by weight). The flake thickness is between 0.009 and 0.016 inch (0.23-0.41 mm). Preferred flaked coffee compositions have a particle size such that 0-12% remains on a No. 12 U.S. Standard Screen, 2-28% passes through a No. 12 but remains on a No. 16 screen, 10-30% passes through a No. 16 but remains on a No. 20 screen, 10-25% passes through a No. 20 but remains on a No. 30 screen, and 30-60% passes through a No. 30 screen.

U.S Pat. No. 3,625,704 to Andre et al., issued Dec. 7, 1971, discloses instant coffee flakes with improved aroma and flowability having a thickness preferably between 0.002 and 0.010 inch (0.05-0.25 mm), and a moisture content before flaking of between 0.5% and 7.0%. The flakes have a size ranging between 0.02 and 0.10 inch (0.5-2.5 mm).

U.S. Pat. No. 3,660,106 to McSwiggin et al., issued May 2, 1972, discloses roast and ground coffee flakes having a thickness of 0.008-0.025 inch (0.20-0.63 mm) and a moisture content before flaking of 2.5-7.0% by weight. The particle size of the coffee after flaking is not disclosed. The flakes are said to be produced in high yield, and to have good structural integrity and little or no flavor degradation.

U.S. Pat. No. 4,110,485 to Grubbs et al., issued Aug. 29, 1978, discloses high sheen roast and ground coffee flakes having a flake thickness of 0.008-0.025 inch (0.20-0.63 mm). Particle size of the flakes is not disclosed. The moisture level before flaking is about 5-6%.

U.S. Pat. No. 3,769,031 to McSwiggin, issued Oct. 30, 1973, discloses roast and ground coffee flakes having a thickness between 0.012 inch and 0.027 inch (0.3-0.7 mm), and a moisture content before flaking between 2.5% and 7.0%. Particle size of the flakes is not disclosed.

U.S. Pat. No. 2,281,320 to Odell, issued Apr. 28, 1942, discloses roast and ground coffee flakes having a thickness between 0.001 and 0.020 inch (0.025-0.51 mm), preferably between 0.007 and 0.010 inch (0.18-0.25 mm), and a moisture content between 25% and 45% before flaking. The patent does not discuss particle size after flaking.

U.S. Pat. No. 3,640,727 to Heusinkveld, issued Feb. 8, 1972, discloses flaked coffee having a flake thickness preferably between 0.005 and 0.025 inch (0.13-0.64 mm), and a moisture content before flaking between 2% and 8%. Particle size after flaking is not discussed.

Although some of the patents state that their flakes have improved extractability, the patents do not suggest how to make a flaked coffee that provides maximum extractability when it is brewed in the ½-gallon coffee brewers and urn brewers typically used in the foodservice industry. Moreover, the prior patents do not describe how to control the interaction between flake thickness, moisture level, and fine particle size level to achieve this increased extractability.

SUMMARY OF THE INVENTION

The invention is a roast and ground flaked coffee that provides the benefits of increased extractability and decreased brewing time when used with foodservice industry ½-gallon brewers and urn brewers. The coffee flakes particularly suited for use in a ½-gallon brewer have a thickness of from about 0.004 inch to about 0.018 inch (about 0.10 mm to about 0.46 mm), a moisture level of from about 3% by weight to about 6% by weight, and a particle size fines level such that from about 30% to about 50% by weight of the particles pass through a No. 20 U.S. Standard Screen. The flake thickness, moisture level, and fines level are related by a brew solids equation.

DESCRIPTION OF THE PREFERRED EMBODIMENTS

It was discovered that there were drawbacks associated with the flaked coffee previously sold to customers in the foodservice industry. A weak-tasting brewed coffee was produced because the coffee flakes did not provide optimum extractability in foodservice industry brewing machines. The brewing time was longer than desired. There were occasional incidences of cup sediment resulting from filter overflow.

In view of these problems with the previous coffee, work was conducted in which flaked coffee samples were made having varying moisture levels, flake thicknesses, and particle size fines levels (defined here as percent particles through a No. 20 U.S. Standard Screen). The samples were brewed in two brewing machines commonly used in the foodservice industry: a Bunn OL-20 ½-gallon brewer and a Cecilware FE-100 urn brewer. Data on brew solids, brew time, and extraction efficiency were collected.

It was unexpectedly discovered that different moisture levels, flake thicknesses, and particle sizes, and different relationships between these parameters, were needed to provide optimum extractability of flaked coffee brewed in different kinds of brewing machines (i.e., foodservice industry brewers versus other brewers, and ½-gallon brewers versus urn brewers).

Specifically, for a ½-gallon brewer used in the foodservice industry it was found that flake thickness, the interaction between moisture level and fines level, and the interaction between flake thickness and fines level are the keys to maximizing brew solids yield. Optimum brewing performance occurred as moisture level increased, flake thickness decreased, and particle size fines level decreased.

For a foodservice industry urn brewer it was found that moisture level, flake thickness, finished product fines level, and the interaction effect between moisture level and fines level are the keys to maximizing brew solids yield. Optimum brewing performance occurred as moisture level increased, flake thickness increased, and particle size fines level decreased. These interactions are described by different equations which have been calculated for the ½-gallon brewer and the urn brewer, and which are disclosed below in Section 4.

Roast and ground coffee flakes made according to the present invention by carefully controlling the moisture level, flake thickness, product fines level, and interactions between these parameters, have increased extractability so that a desirably stronger coffee beverage can be made. The coffee flakes brew more rapidly, so a shorter brewing time is required. When the coffee flakes are used in the form of loose ground coffee in paper filters, there are fewer incidences of cup sediment resulting from filter overflow. The invention is especially suited for coffee which has been fast roasted.

Flake thickness, moisture level, particle size distribution, and the relationship between these characteristics for the present coffee flakes are discussed hereinbelow:

1. FLAKE THICKNESS

The roast and ground coffee flakes of the present invention particularly suited for use in an urn brewer have an average flake thickness between about 0.004 inch (0.10 mm) and about 0.022 inch (0.56 mm), preferably between about 0.014 inch (0.36 mm) and about 0.022 inch (0.56 mm). The method for measuring average flake thickness is described hereinbelow in Section 6.

Coffee flakes particularly suited for use in a ½-gallon brewer have an average thickness between about 0.004 inch (0.10 mm) and about 0.018 inch (0.46 mm), preferably between about 0.004 inch (0.10 mm) and about 0.014 inch (0.36 mm).

2. MOISTURE LEVEL

The coffee flakes of the invention have an average moisture level of about 3% to about 6% by weight of the coffee flakes. Preferred coffee flakes have an average moisture level of about 4.5% to about 5.5% by weight.

Typically, moisture level of the flaked coffee is adjusted by varying the moisture level of the roast and ground coffee feed from which the flakes are produced. The adjustments to the feed moisture level can be controlled, for example, by controlling the amount of water used to quench and thereby halt the roasting operation. If a cool air quench is used, the moisture level can be adjusted by spraying on additional water after quenching or after grinding. The moisture level of the roasted beans is not appreciably affected by the grinding or milling operations.

3. PARTICLE SIZE DISTRIBUTION

The coffee flakes of this invention have a particle size which is adjusted so that the level of fine particles is within a specified range, where "fine particles" is defined herein as the percentage of particles that pass through a No. 20 U.S. Standard Screen. The coffee flakes have a particle size fines level such that from about 30% to about 50% by weight of the particles pass through a No. 20 U.S. Standard Screen. Preferably from about 35% to about 45% by weight of the particles pass through a No. 20 U.S. Standard Screen.

It is conventional in the coffee art to describe coffee particle size distribution, including flaked coffee, in terms of screen or "sieve" fractions, i.e. that weight percentage which remains on a particular screen or that weight percentage which passes through a particular screen. For example, a flaked coffee product might have a screen analysis such that 40% by weight passes through a U.S. Standard No. 20 Screen with 60% by weight remaining on the No. 20 screen. Since the screen opening for a No. 20 U.S. Standard Screen is approximately 0.033 inch (0.84 mm), such a coffee product would comprise about 40% by weight of particles which have a particle width less than 0.033 inch, while the remaining weight fraction would comprise particles which have a particle size greater than the 0.033 inch size opening.

The present coffee flakes have a particle size that is larger than the extra-thin flakes described in U.S. Pat. No. 4,331,696 to L Bruce, and smaller than the thick flakes described in U.S. Pat. No. 3,615,667 to Joffe. Whereas the flakes disclosed by Joffe have a particle size such that 3–10% pass through a No. 40 U.S. Standard Screen, the flakes of this invention have a size such that between about 20% and about 50% pass through a No. 40 screen. The most preferred flakes disclosed by Bruce have a particle size such that about 50% passes through a No. 30 U.S. Standard Screen, while the flakes of this invention have a size such that between about 20% and about 60% pass through a No. 30 screen. Further, the Bruce flakes will have too many particles that pass through a No. 20 screen.

4. BREW SOLIDS EQUATIONS

The following equations describe the interactions between flake thickness, moisture level and particle size fines level necessary to produce maximum brew solids when brewing in an urn brewer or a ½-gallon brewer:

a) Urn Brewer

For non-decaffeinated (regular) coffee flakes particularly suited for use in an urn brewer, the desired brew solids yield is between about 0.36% and about 0.96%, preferably between about 0.79% and about 0.89%. This brew solids yield is on the basis of brewing 283.5 grams of the flaked coffee in an urn brewer with 3 gallons of water. The key variables are adjusted according to the following equation to provide a target yield of from about 0.36% to about 0.96% brew solids during brewing:

$$0.36 \text{ to } 0.96 = 0.686 + (0.0244 \times FT) - (0.150 \times FF) + (0.00217 \times MO \times FF).$$

"FT" represents the average flake thickness in mils (thousandths of an inch). (If "FT" is given in millimeters, the FT part of the equation changes to "(0.959×FT)".) "FF" represents the particle size fines level, which is defined as the percentage of flakes which pass through a No. 20 U.S. Standard Screen. "MO" represents the average moisture level in weight percent.

The actual measured brew solids yield may be slightly different from the brew solids yield calculated from the equation. However, the important thing is that the moisture level, flake thickness and fines level be chosen to fit into the equation to provide the target brew solids range; if they are so chosen, that will provide the optimum actual brew solids. As discussed above, preferably the actual measured brew solids is within the target calculated range.

As an illustration, if a flaked coffee product has a flake thickness of 0.008 inch (8 mils), a fines level of 54%, and a moisture level of 5.9%, the percent calculated brew solids is 0.76% as follows:

$$0.686 + (0.0244 \times 8) - (0.150 \times 54) + (0.00217 \times 5.9 \times 54) = 0.76$$

Since about 0.06% soluble solids in a regular non-decaffeinated coffee brew consist of caffeine, coffee which has been decaffeinated will contain fewer brew solids. For decaffeninated coffee the desired brew solids range is 0.30% to 0.90%, preferably 0.73% to 0.83%.

b) ½-Gallon Brewer

For non-decaffeinated (regular) coffee flakes particularly suited for use in a ½-gallon brewer, the desired brew solids yield is between about 0.57% and about 0.90%, preferably between about 0.79% and about 0.89%, when 48.2 grams of the flaked coffee is brewed with ½ gallon of water. The following equation is used for these flakes:

$$0.57 \text{ to } 0.90 = 1.254 - (0.0361 \times MO) - (0.0221 \times FT) - (0.00504 \times FF) + (0.00068 \times MO \times FF).$$

(If "FT" is given in millimeters instead of mils, the FT part of the equation changes to "(0.871×FT)".)

For decaffeinated coffee the desired brew solids range is 0.51% to 0.84%, preferably 0.73% to 0.83%.

c) Definitions

The greater extractability provided by the flaked coffee of the present invention enables more cups of equal brew strength and flavor to be brewed from a given amount of coffee. The normal method of measuring the strength of a coffee brew is to measure the percent soluble solids which is commonly referred to as "brew solids". The method for measuring brew solids is described in Section 6 hereinbelow.

The percent brew solids measurement is dependent on the weight of coffee and the volume of water used in the brewing process. For example, at column 12, lines 29–62 of U.S. Pat. No. 4,331,696 to Bruce, 57.0 grams of coffee are brewed in a Bunn OL20 12-cup (½-gallon) brewing machine, and the percent brew solids is 0.88%. On the other hand, the percent brew solids range in the present invention is on the basis of brewing 48.2 grams of coffee with ½ gallon of water. The Bruce example would have about 0.74% brew solids on the basis of using 48.2 grams of coffee (0.88% ×48.2/57.0), whereas in the present invention up to about 0.90% brew solids can be obtained using a ½-gallon brewer.

"Urn brewers" and "½-gallon brewers" are the two types of brewers commonly used in the foodservice industry, and these terms are known to those skilled in the art. Examples of urn brewers are a Cecilware FE-100 urn brewer, a Bunn urn brewer, and a Blickman urn brewer. Examples of ½-gallon brewers are a Bunn OL-20 ½-gallon brewer, a Cecilware ½-gallon brewer, and a Curtis ½-gallon brewer.

Urn brewers are described in Sivetz et al., *Coffee Technology*, Avi Publishing Co. (1979), at pages 635, 636, 673–675 and 676–680. Essentially, urn brewers are large heated pots that hold a large volume of coffee (e.g., between 3 and 12 gallons or more). The coffee is generally prepared by pumping or spraying near boiling water through ground or flaked coffee held in a filter at the top of the urn. Half gallon brewers can have various designs and operating modes (most common is a drip coffee maker), but what they all have in common is that they hold ½ gallon of coffee. Sivetz et al., supra, at pages 673–675, discusses coffee brewing in the foodservice industry. Urns and ½-gallon brewers are discussed at the bottom of page 674. In Table 17.1 at page 675, it is disclosed that ½-gallon brewers comprise about 70% of the brewing equipment used in restaurants, while urns comprise about 23%.

5. PREPARATION OF THE FLAKED COFFEE a) Starting Material Selection

The roast and ground flaked coffee of the present invention can be made from a variety of roast and ground coffee blends, including those which may be classified for convenience and simplification as low-grade, intermediate-grade, and high-grade coffees. Suitable examples of low-grade coffees include the natural Robustas such as the Ivory Coast Robustas and Angola Robustas, and the Natural Arabicas such as the natural Perus and natural Ecuadors. Suitable intermediate-grade coffees include the natural Arabicas from Brazil such as Santos, Paranas and Minas, and natural Arabicas such as Ethiopians. Examples of high-grade coffees include the washed Arabicas such as Mexicans, Costa Ricans, Colombians, Kenyas and New Guineas. Other examples and blends thereof are known in the art. Decaffeinated roast and ground coffee also can be used herein to make a decaffeinated flaked coffee product.

b) Roasting

Green coffee beans are roasted to a Hunter "L" color of from about 18 to about 23. It is preferable that the beans are subjected to a "fast roasting" process whereby they are roasted for approximately 1 to approximately 5 minutes, more preferably for about 1 to about 1½ minutes, at temperatures between about 590° F. (310° C.) and about 605° F. (318° C.). If beans are roasted for less than 1 minute, the roast is not uniform and insufficient flavor development occurs. Fast roasting is preferred because higher aroma levels and extractable solids are generated.

After the coffee beans have been roasted they are cooled to a temperature below about 65° F. (18° C.) by conventional water quenching, followed by additional cooling using refrigerated air to achieve the desired temperature. Instead of water quenching, other cooling methods such as liquid nitrogen, carbon dioxide, cool air, etc., can also be used.

c) Grinding

The flaked coffee of the invention can be ground to "coarse", "regular", "drip" or "fine" sizes known to the art. Preferably the coffee is ground to a "coarse" grind. As used herein, "coarse" grind size indicates that the roast and ground coffee has a particle size distribution such that:

(a) from 40% to 95% by weight retained on a No. 12 U.S. Standard Screen, (b) from 0% to 37% by weight retained on a No. 16 U.S. Standard Screen, (c) from 0% to 12% by weight retained on a No. 20 U.S. Standard Screen, (d) from 0% to 10% by weight retained on a No. 30 U.S. Standard Screen, (e) from 0% to 8% by weight pass through a No. 30 U.S. Standard Screen.

Typical grinding equipment and methods for grinding roasted coffee beans are described, for example, in Sivetz & Foote, "Coffee Processing Technology" 1963, Vol. 1, pp. 239–250.

d) Roll Milling

The roll milling operation to make the flaked coffee of the present invention is similar to that described at column 7, line 8, to column 9, line 56, of the U.S. Pat. No. 4,331,696 to Bruce, issued May 25, 1982, which disclosure is herein incorporated by reference. However, the present coffee flakes are not as thin as the extra-thin flaked coffee described by Bruce, and the present flakes are larger in particle size than the Bruce flakes. Accordingly, compared to the Bruce patent, the roll milling conditions will be adjusted somewhat to produce slightly larger and thicker flakes. The means of producing these flakes is not critical as long as the resultant flakes have the required product characteristics. Larger, thicker flakes can be made by adjusting any of several processing parameters, such as decreasing the roll pressure, increasing the static gap between the rolls, or decreasing the roll peripheral surface speed at the same feed rate. These interactions are described generally at column 10, line 39 to column 13, line 37 of U.S. Pat. No. 4,267,200 to Klien et al., which disclosure is incorporated by reference herein, and specifically at column 12, lines 52–64 and column 13, lines 26–37.

To produce the present coffee flakes, the roll pressure should be within the range of from about 37.5 lbs./linear inch of nip to about 300 lbs./linear inch of nip, preferably from about 56 lbs./linear inch to about 94 lbs./linear inch. The roll surface temperature should be between 50° F. and 80° F., preferably between 60° F. and 80° F. The diameter of the roll mills should be between about 6 inches and about 48 inches, preferably between about 6 inches and about 30 inches. Preferably a zero static gap is used, but suitable gap settings range from 0 up to about 0.001 inch. The moisture content of the roast and ground coffee feed is between about 3% and about 6%. The feed rate is between about 50 lbs./hr./inch and about 160 lbs./hr./inch; preferably starve feeding is used. The roll peripheral surface speed of the roll mill is from about 328 ft./minute to about 1,414 ft./minute, preferably from about 707 ft./minute to about 1,178 ft./minute.

After the roast and ground coffee feed has been flaked by being passed through the roll mill, it is preferred but not essential that the flaked coffee be screened to remove any oversized flakes caused by the presence of impurities in the roast and ground coffee feed. It is also possible to remove excessive fine particles caused by a secondary grinder effect. If screening is conducted, it is preferred to use a Sweco screening device equipped with a 12 mesh U.S. Standard Screen, and to screen the coffee between about 120 seconds and 240 seconds.

6. MEASUREMENT TECHNIQUES a) Flake Thickness 100 grams of the flaked coffee is poured onto a circular U.S. Standard No. 12 Screen and is agitated by a "Ro-Tap" sieve (screen) shaker (manufactured by U.S. Tyler Co.) for three minutes. The flaked coffee which passes through the No. 12 screen is thereafter similarly screened for three minutes using a U.S. Standard Screen No. 16. Ten representative flakes from the portion remaining on the No. 16 screen are selected for flake thickness measurement. Each representative flake particle is measured for thickness using a Federal Model 22P-10 gauge manufactured by Federal Co. The ten flake thickness measurements are averaged to characterize the average flake thickness. b) Moisture Level The average moisture level of the flakes is measured using a standard moisture meter, specifically a Computrac Moisture Analyzer, Model MA-5A, manufactured by Quintel Corporation.

c) Particle Size Distribution

The particle size distribution of the coffee flakes is measured by the use of a "Ro-Tap" multiple sieve shaker manufactured by U.S. Tyler Co. The following circular U.S. Standard Screens are mounted on the sieve shaker: No. 12, No. 16, No. 20, No. 30, and optionally No. 40 (and a pan to collect the particles passing through all the screens). 100 grams of the coffee flakes are poured onto the No. 12 screen, and the sieve shaker is agitated for 3 minutes. Then the weight percentage of particles on each screen and in the pan are measured.

d) Brew Solids

The percent "brew solids" or soluble solids in the coffee brew can be measured by oven-drying the brewed coffee and weighing the remaining solids. The percent brew solids can also be ascertained optically by measuring the index of refraction of the coffee brew. The index of refraction is correlated to brew solids as measured by the oven-drying technique.

EXAMPLE 1

A flaked coffee product particularly suitable for use in a ½-gallon brewer is prepared as follows. One thousand pounds of a blend comprising 25 percent high quality Arabicas, 38.75 percent Brazils, 6.25 percent low quality Arabicas and 30 percent Robustas is roasted in a Jetzone roaster at air temperatures within the range of from 590° F. to 600° F. The total roast time is 67 seconds and the roast is then quenched with cool air to a temperature below 65° F. (18° C.).

The roasted blend is ground to coarse grind size in a Gump pilot grinder. After grinding, water is sprayed onto the ground beans to increase their moisture level to about 6.0%. The coarse grind roast and ground coffee is then starve-fed by dropping a cascade of the particles into the rolls of a "Ross" two-roll mill. The feed rate of the particles is about 130 lbs./hr./linear inch of nip. The two-roll mill is set at zero static gap, and each roll is about 18.1 inches (46 cm) in diameter. The roll pressure is about 281 lbs./linear inch of nip. Each roll is operated at a roll peripheral surface speed of about 942 ft./minute. The surface temperature of the rolls is maintained between 60° F (16° C.) and 80° F. (27° C.) by water cooling; the average surface temperature is about 70° F. (21° C.). The flaked coffee particles dropping from between the rolls are gravity-fed into a 12 mesh (U.S. Standard) Sweco screening device and are screened for 180 seconds.

The product coffee flakes have an average moisture level of 2.9% by weight. Additionally, the coffee flakes have a particle size such that 10% by weight of the particles remain on a No. 12 U.S. Standard Screen, 30% by weight remain on a No. 16 screen, 30% by weight remain on a No. 20 screen, 10% by weight remain on a No. 30 screen, and 20% by weight pass through a No.

30 screen. (A total of 30% by weight pass through a No. 20 screen.) The product has an average flake thickness of 0.008 inch (0.20 mm).

When 48.2 g of the flaked coffee is brewed in a Bunn OL-20 ½-gallon brewing machine with ½ gallon of water, the brew solids yield is 0.92%.

EXAMPLE 2

A flaked coffee product particularly suitable for use in an urn brewer is prepared as described in Example 1, with the following changes. After roasting and grinding, the coffee beans are sprayed with water to a moisture level of about 6.0%. The feed rate to the mill is about 160 lbs./hr./inch. The roll pressure is about 75 lbs./linear inch of nip. The roll peripheral speed of each roll is about 942 ft./minute. The particles are not screened after flaking.

The product coffee flakes have an average moisture level of 5.5% by weight. The flakes have a particle size such that 7.9% by weight remain on a No. 12 screen, 20.8% by weight remain on a No. 16 screen, 30% by weight remain on a No. 20 screen, 16.7% by weight remain on a No. 30 screen, and 24% by weight pass through a No. 30 screen. (A total of 40.7% by weight pass through a No. 20 screen.) The average flake thickness is 0.012 inch. When 283.5 g of the flaked coffee is brewed with 3 gallons of water in a Cecilware FE-100 urn brewer, the brew solids yield is 0.88%.

What is claimed is:

1. Non-decaffeinated roast and ground coffee flakes particularly suited for use in an urn brewer, wherein the flakes have:
   (a) an average thickness of from about 0.004 inch to about 0.022 inch;
   (b) an average moisture level of from about 3% to about 6% by weight; and
   (c) a particle size fines level such that from about 30% to about 50% by weight of the particles pass through a No. 20 U.S. Standard Screen, and from about 20% to about 50% by weight of the particles pass through a No. 40 U.S. Standard Screen; and
   (d) wherein the average flake thickness ("FT"), average moisture level ("MO"), and particle size fines level ("FF") are adjusted according to the following equation:

$$0.36 \text{ to } 0.96 = 0.686 + (0.0244 \times FT) - (0.0150 \times FF) + (0.0217 \times MO \times FF).$$

2. Decaffeinated roast and ground coffee flakes particularly suited for use in an urn brewer, wherein the flakes have:
   (a) an average thickness of from about 0.004 inch to about 0.022 inch;
   (b) an average moisture level of from about 3% to about 6% by weight; and
   (c) a particle size fines level such that from about 30% to about 50% by weight of the particles pass through a No. 20 U.S. Standard Screen, and from about 20% to about 50% by weight of the particles pass through a No. 40 U.S. Standard Screen; and
   (d) wherein the average flake thickness ("FT"), average moisture level ("MO"), and particle size fines level ("FF") are adjusted according to the following equation:

$$0.30 \text{ to } 0.90 = 0.686 + (0.0244 \times FT) - (0.0150 \times FF) + (0.0217 \times MO \times FF).$$

3. Roast and ground coffee flakes according to claim 1 or 2 wherein the flakes have an average thickness of from about 0.014 inch to about 0.022 inch.

4. Roast and ground coffee flakes according to claim 1 or 2 wherein the flakes have an average moisture level of from about 4.5% to about 5.5% by weight.

5. Roast and ground coffee flakes according to claim 1 or 2 wherein the flakes have a particle size fines level such that from about 35% to about 45% by weight of the particles pass through a No. 20 U.S. Standard Screen.

6. Roast and ground coffee flakes according to claim 1 wherein the average flake thickness, average moisture level, and particle size fines level are adjusted according to the following equation:

$$0.79 \text{ to } 0.89 = 0.686 + (0.0244 \times FT) - (0.0150 \times FF) + (0.0217 \times MO \times FF).$$

7. Roast and ground coffee flakes according to claim 2 wherein the average flake thickness, average moisture level, and particle size fines level are adjusted according to the following equation:

$$0.73 \text{ to } 0.83 = 0.686 + (0.0244 \times FT) - (0.0150 \times FF) + (0.0217 \times MO \times FF).$$

8. Roast and ground coffee flakes according to claim 1 or 2 wherein the flakes have been fast roasted for a time between about 1 minute and about 1½ minutes at a temperature between about 590° F. and about 605° F.

9. Non-decaffeinated roast and ground coffee flakes particularly suited for use in a ½-gallon brewer, wherein the flakes have:
   (a) an average thickness of from about 0.004 inch to about 0.018 inch;
   (b) an average moisture level of from about 3% to about 6% by weight; and
   (c) a particle size fines level such that form about 30% to about 50% by weight of the particles pass through a No. 20 U.S. Standard Screen, and from about 20% to about 50% by weight of the particles pass through a No. 40 U.S. Standard Screen; and
   (d) wherein the average flake thickness ("FT"), average moisture level ("MO"), and particle size fines level ("FF") are adjusted according to the following equation:

$$0.57 \text{ to } 0.90 = 1.254 - (0.0361 \times MO) - (0.0221 \times FT) - (0.00504 \times FF) + (0.00068 \times MO \times FF).$$

10. Decaffeinated roast and ground coffee flakes particularly suited for use in a ½-gallon brewer, wherein the flakes have:
    (a) an average thickness of from about 0.004 inch to about 0.018 inch;
    (b) an average moisture level of from about 3% to about 6% by weight; and
    (c) a particle size fines level such that from about 30% to about 50% by weight of the particles pass through a No. 20 U.S. Standard Screen, and from about 20% to about 50% by weight of the particles pass through a No. 40 U.S. Standard Screen; and (d) wherein the average flake thickness ("FT"), average moisture level ("MO"), and particle size fines level ("FF") are adjusted according to the following equation:

$$0.51 \text{ to } 0.84 = 1.254 - (0.0361 \times MO) - (0.0221 \times FT) - (0.0504 \times FF) + (0.00068 \times MO \times FF).$$

11. Roast and ground coffee flakes according to claim 9 or 10 wherein the flakes have an average moisture level of from about 0.004 inch to about 0.014 inch.

12. Roast and ground coffee flakes according to claim 9 or 10 wherein the flakes have an average moisture level of from about 4.5% to about 5.5% by weight.

13. Roast and ground coffee flakes according to claim 9 or 10 wherein the flakes have a particle size fines level such that from about 35% to about 45% by weight of the particles pass through a No. 20 U.S. Standard Screen.

14. Roast and ground coffee flakes according to claim 9 wherein the average flake thickness, average moisture level, and particle size fines level are adjusted according to the following equation:

$$0.79 \text{ to } 0.89 = 0.686 + (0.0244 \times FT) - (0.0150 \times FF) + (0.0217 \times MO \times FF).$$

15. Roast and ground coffee flakes according to claim 10 wherein the average flake thickness, average moisture level, and particle size fines level are adjusted according to the following equation:

$$0.73 \text{ to } 0.83 = 0.686 + (0.0244 \times FT) - (0.0150 \times FF) + (0.0217 \times MO \times FF).$$

16. Roast and ground coffee flakes according to claim 9 or 10 wherein the flakes have been fast roasted for a time between about 1 minute and about 1½ minutes at a temperature between about 590° F. and about 605° F.

* * * * *